(12) United States Patent
    Aggarwal

(10) Patent No.: US 12,654,714 B2
(45) Date of Patent: Jun. 16, 2026

(54) SYSTEM FOR DETERMINING DRIVE RELATED INFORMATION FOR COMMUTATION BEING CARRIED OUT BY USER IN VEHICLE

(71) Applicant: Kamal Aggarwal, Bangalore (IN)

(72) Inventor: Kamal Aggarwal, Bangalore (IN)

( * ) Notice: Subject to any disclaimer, the term of this patent is extended or adjusted under 35 U.S.C. 154(b) by 1 day.

(21) Appl. No.: 18/846,312

(22) PCT Filed: Mar. 14, 2023

(86) PCT No.: PCT/IB2023/052473
    § 371 (c)(1),
    (2) Date: Sep. 12, 2024

(87) PCT Pub. No.: WO2023/175505
    PCT Pub. Date: Sep. 21, 2023

(65) Prior Publication Data
    US 2025/0196864 A1      Jun. 19, 2025

(30) Foreign Application Priority Data

Mar. 15, 2022    (IN) ............................. 202141041461

(51) Int. Cl.
    *B60W 40/09*        (2012.01)
    *B60W 50/00*        (2006.01)

(52) U.S. Cl.
    CPC ............ *B60W 40/09* (2013.01); *B60W 50/00* (2013.01); *B60W 2050/0028* (2013.01); *B60W 2420/54* (2013.01); *B60W 2520/105* (2013.01)

(58) Field of Classification Search
    None
    See application file for complete search history.

(56) References Cited

U.S. PATENT DOCUMENTS

| | | | |
|---|---|---|---|
| 2016/0216130 A1* | 7/2016 | Abramson | ......... G01C 21/3423 |
| 2019/0182749 A1* | 6/2019 | Breaux | ................. H04W 4/027 |
| 2021/0107501 A1* | 4/2021 | Monteil | .................. G06N 5/02 |
| 2022/0032924 A1* | 2/2022 | Jeihani | .................. B60W 50/14 |
| 2022/0306125 A1* | 9/2022 | Javeri | .................... H04W 4/40 |

* cited by examiner

*Primary Examiner* — Thomas S Mccormack

(57)        ABSTRACT

A system (1) for determining a drive related information (10, 11) for a commutation being carried out by a user in a vehicle. The system includes a first processing unit (6) which receives and processes a motion statistical data (3), a driving pattern data (4), or, a sound data (5), or combination thereof based at least on one or more of trained machine learning models (7, 8, 9) to determine the drive related information (10, 11) for the commutation being carried out by the user in the vehicle. The motion statistical data (3) is derived from acceleration and/or speed of a vehicle at various instances during a trip. The driving pattern data (4) is related to driving patterns of a driver and/or a driving behaviour of a driver. The sound data (5) is related to statistical pattern, or frequency profile derived using a microphone kept inside the vehicle.

8 Claims, 1 Drawing Sheet

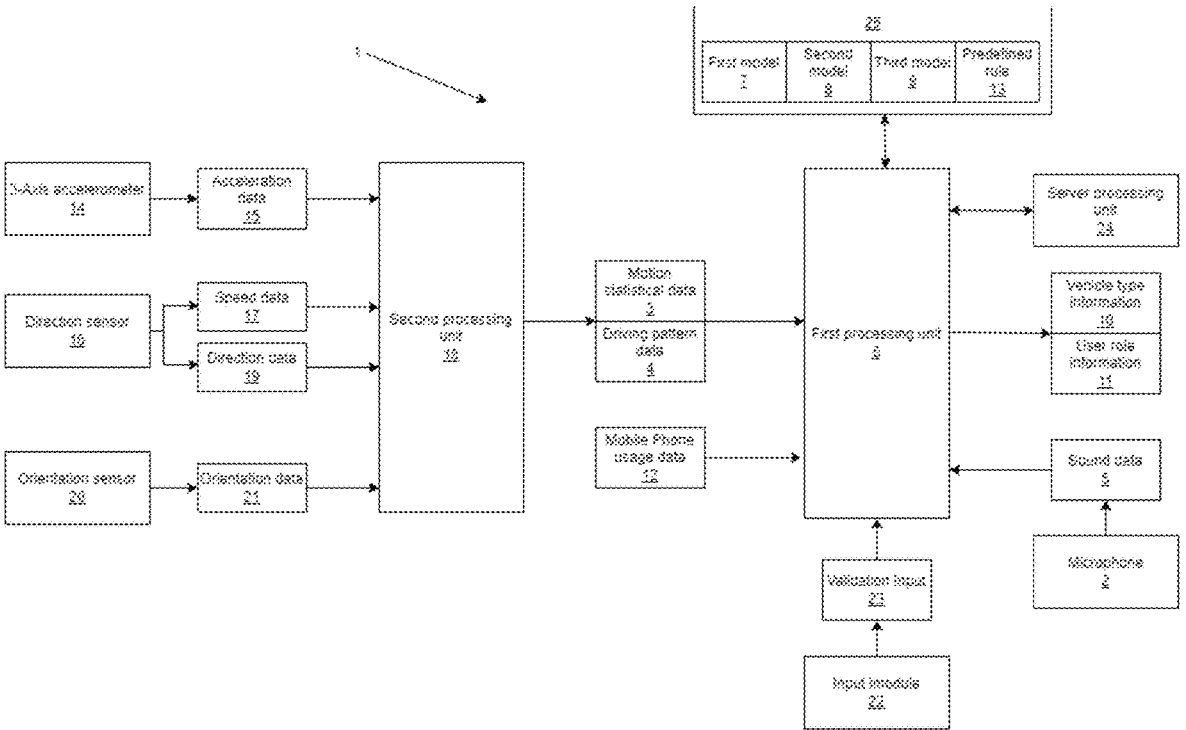

SYSTEM FOR DETERMINING DRIVE RELATED INFORMATION FOR COMMUTATION BEING CARRIED OUT BY USER IN VEHICLE

FIELD OF THE INVENTION

The present invention relates to determining a drive related information for a commutation being carried out by a user in a vehicle. More particularly the invention relates to determining a vehicle type used during the drive for the commutation being carried out by the user in the vehicle and a user role as a driver or a commuter used during the drive for the commutation being carried out by the user in the vehicle.

BACKGROUND OF THE INVENTION

In modern days, road safety is becoming an increasing concern for everyone with the rising number of accidents. Driving behavior and road accidents are directly related to each other. Around 1.35 million people get killed in road accidents around the world each year. It is possible to avoid most by following certain safety measures. However, these measures are often overlooked by drivers in today's hectic world. Existing methods of monitoring Driving Behavior of a driver driving a vehicle involve use of standalone Telematics Data processing system, driving policy, training etc. to overcome accident risk and safe driving practices.

The existing solutions are lacking in accuracy, portability, and automation. A solution is desired where the system implementation should detect a type of vehicle being driven, and also should be able to determine which traveler is a driver, so that the system can capture and process parameters with respect to the particular traveler who is the driver, and the particular vehicle which is being driven for continuous and automated driving behavior monitoring and ranking with high accuracy.

OBJECT OF THE INVENTION

The object of the invention is to provide a system for determining a drive related information for a commutation being carried out by a user in a vehicle in automated and continuous fashion.

SUMMARY OF THE INVENTION

The object of the invention is achieved by a system for determining a drive related information for a commutation being carried out by a user in a vehicle. The system includes an input interface adapted to receive a motion statistical data, a driving pattern data, or, a sound data, or combination thereof. The motion statistical data is statistical data derived from acceleration, or speed, or combination thereof of a vehicle at various instances during a trip. The driving pattern data is related to driving patterns of a driver, or a driving behaviour of a driver or combination thereof derived using various sensory data captured from sensors placed inside the vehicle. The sound data is related to statistical pattern, or frequency profile derived using a microphone kept inside the vehicle. The system also includes a first processing unit which receives and processes the motion statistical data, a driving pattern data, or, a sound data, or combination thereof based at least on one or more of trained machine learning models to determine the drive related information for the commutation being carried out by the user in the vehicle.

According to one embodiment of the system, wherein the trained machine learning models can be one or more of the following models. A first model which is developed based on patterns and thresholds of motion statistical data for different vehicles. A second model which is developed based on the statistical characteristics and driving patterns of each Driver. A third model which is developed based on patterns of sound data captured from microphone kept inside vehicle, and associates sound data with an engine's noise of starting and running user's own vehicle with respect to another vehicle.

According to another embodiment of the system, wherein the first processing unit processes the motion statistical data, or a sound data, or combination thereof based at least on the first model, or the third model, or combination thereof. Based on processing, the first processing unit determines a vehicle type used during the drive for the commutation being carried out by the user in the vehicle.

According to yet another embodiment of the system, wherein the first processing unit processes the motion statistical data and the driving pattern data based on the second model to determine a user role as a driver or a commuter used during the drive for the commutation being carried out by the user in the vehicle.

According to one embodiment of the system, wherein the input interface receives a mobile phone usage data related to use of mobile phone or connections established by the mobile phone or combination thereof. The first processing unit processes the mobile phone usage data or connections established by the mobile phone or combination thereof based on a set of predefined rules, and the driving sensor statistical data, a driving pattern data, or, a sound data, or combination thereof based at least one or more of the trained models and determines the drive related information for the commutation being carried out by the user in the vehicle.

According to another embodiment of the system, wherein the mobile phone usage data includes an application usage data, or a Bluetooth connection data or combination thereof. The application usage data relates to frequency and duration of various mobile applications opened and used by the user during the drive. The Bluetooth connection data relates to duration and frequency of various connections of a smartphone being carried by the user to one or more peripheral Bluetooth devices.

According to yet another embodiment of the system, the system includes a 3-axis accelerometer or a direction sensor, or combination thereof, which are placed inside the vehicle. The 3-axis accelerometer generates an accelerometer data related to an acceleration of the vehicle at each time instant. The direction sensor generates a speed of the vehicle at each time instant, or combination thereof. The system also includes a second processing unit which receives and processes the accelerometer data, or the speed data, or combination thereof to generate the motion statistical data.

According to one embodiment of the system, wherein the direction sensor also generates a direction data related to a direction in which the 3-axis accelerometer is travelling. The system also includes an orientation sensor placed inside the vehicle, and generate an orientation data related to an orientation and an angular velocity of the 3-axis accelerometer. The second processing unit processes the accelerometer data, the direction data and the orientation data to generate the driving pattern data.

According to another embodiment of the system, wherein the driving pattern data includes a distance covered in the drive, a duration covered in the drive, a time of the drive, a day of drive, a location for starting the drive, a location for one or more pause during the drive a location of destination of the drive, or a route taken during the drive, or combination thereof.

According to yet another embodiment of the system, wherein the driving pattern data comprises a driving behaviour of the user during the drive which is related to a driving deficiency and is defined by over-speeding, hard acceleration, sudden braking, fast cornering, quick lane changing, distracted driving, or dangerous driving over bumps, or combination thereof.

According to one embodiment of the system, the system includes an input module which receives a validation input from the user related to a role of the user as a driver or the commuter, or a type of the vehicle, or combination thereof. The first processing unit includes one or more processing modules. At least one of the processing modules is placed inside the mobile phone of the user in the vehicle and the processing module placed inside the mobile phone of the user in the vehicle is communicatively coupled to a server processing unit and sends the drive related data, the validation input, the motion statistical data, a driving pattern data, or, a sound data, or combination thereof to the server processing unit. The server processing unit updates the one or more of trained machine learning models and sends the updated one or more of trained machine learning models to the processing module placed inside the mobile phone to replace the previously used the one or more of trained machine learning models.

BRIEF DESCRIPTION OF DRAWINGS

The novel features and characteristics of the disclosure are set forth in the description. The disclosure itself, however, as well as a preferred mode of use, further objectives and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which:

FIG. 1 shows a schematic diagram of a system for determining a drive related information for a commutation being carried out by a user in a vehicle.

The FIGURES depict embodiments of the disclosure for purposes of illustration only. One skilled in the art will readily recognize from the following description that alternative embodiments of the assemblies, structures and methods illustrated herein may be employed without departing from the principles of the disclosure described herein.

DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting. The system, methods, and examples provided herein are only illustrative and not intended to be limiting.

Embodiments of the present invention will be described below in detail with reference to the accompanying FIGURES.

The present disclosure provides for a system for automatic identification of the type of vehicle the user is traveling in and the role of the user in the vehicle (driver or passenger) based on the analysis of the smartphone data of the user. This data includes the data from various sensors in the Smartphone as well as certain supplementary data from the Smartphone.

In the above applications of Smartphone Telematics, it is important to identify if the User whose Smartphone data is collected to determine the driving behavior is the driver of the vehicle or is traveling as a passenger (hence called as the role of user in the vehicle). It is also important to identify the type of vehicle in which the User is traveling, such as a car, motorcycle, bus, train or subway.

In addition, there is a need to distinguish if the User is driving himself/herself or is a passenger in the vehicle. Even if the user is in his/her own vehicle (lets say personal car), there is a need to distinguish if the User is driving or having another Driver who is driving the vehicle. In general, if there are multiple drivers using the vehicle, there is a need to classify which Driver is driving a particular trip so as to correctly classify the driving behavior of each driver for personalized risk assessment purpose.

These determinations are needed in several practical use cases of Smartphone Telematics, including Insurance where Insurance company (depending upon the nature of its Insurance policy) is specifically concerned with accident risk when the user is his/her own vehicle (such as a specified car) and/or when the user is driving his/her own vehicle.

Automatic identification of the type of vehicle and the role of the user enables correctly tagging each trip recorded by User's Smartphone. This tagging enables filtering the trips where the User is involved as a driver of a certain type of vehicle. As an example, for determining the Safe Driving Score of the User as a Car driver, only those trips in which the User plays the role of a Driver and the vehicle is identified as a Car are used for calculating the overall driving score of the User. Similarly, for determining the Safe Driving Score of the User as a Motorcycle rider, only those trips in which the User plays the role of a Driver and the vehicle is identified as a Motorcycle are then used for calculating the overall driving score of the User.

It is to be noted that this Safe Driving score can be compared across drivers as well as across time to give guidance to the driver to improve driving skills and behavior for safe driving aspect. For personal owned vehicles, Smartphone Telematics system can be used for giving guidance to a vehicle owner or driver to drive in a safe manner. For fleet vehicles that are owned by an organization, the system can be used as part of fleet Management System to ensure safe driving practices and reduce accident risk.

For Motor Insurance companies, the system can be used to rate the accident risk of each driver or vehicle that is insured by the Insurance company. The System can be used to create underwriting models as part of Usage Based Insurance policies wherein the premium of the policy is varied based on the Driving behavior of the Driver or Drivers driving a certain vehicle.

Vehicle Manufacturers can use this system to understand how drivers drive the vehicles in the field under various driving conditions and hence design vehicles with adequate safety measures, controls and warning systems. Other players in the automotive ecosystem are also interested in monitoring driving behavior and providing solutions based on driving behavior.

FIG. 1 elaborates a schematic diagram of a system for determining a drive related information for a commutation being carried out by a user in a vehicle.

The system (1) shows a first processing unit (6), a second processing unit (18), a memory unit (25), a server processing unit (24), a set of sensors (14, 16, 20) which cooperates to perform functionality of the system to provide drive related information (10, 11) for a commutation being carried out by a user in a vehicle.

The second processing unit (18) is in communication coupling with the 3-axis accelerometer (14), a direction sensor (16), an orientation sensor (20), and the first processing unit (6). The 3-axis accelerometer (14), the direction sensor (16), and the orientation sensor (20) are placed inside the vehicle. In one embodiment, these sensors (14, 16, 20) may be provided as part of the smartphone or the mobile phone being carried by the user inside the vehicle. In such scenario, the gyroscope sensor of the mobile phone can be used as the orientation sensor (20), and the GPS sensor of the mobile phone can be used as the direction sensor (16).

The 3-axis accelerometer generate an accelerometer data (15) related to an acceleration of the vehicle at each time instant. The direction sensor (16) generates a speed (17) of the vehicle at each time instant and a direction data (19) related to a direction in which the 3-axis accelerometer (14) is travelling. The orientation sensor (20) generates an orientation data (21) related to an orientation and an angular velocity of the 3-axis accelerometer (14).

The second processing unit (18) processes the accelerometer data (15), and the speed data (17) and generates the motion statistical data (3). In one embodiment, the second processing unit (18) only uses either of the accelerometer data (15), or the speed data (17) to generate the motion statistical data (3). The motion statistical data (3) may include mean, median, max, min, quartiles, variance, skewness and kurtosis of the time series of the accelerometer data (15), and/or the speed data (17).

The second processing unit (18) is adapted to process the accelerometer data (15), the direction data (19) and the orientation data (20) to generate the driving pattern data (4).

The driving pattern data (4) can include a distance covered in the drive, a duration covered in the drive, a time of the drive, a day of drive, a location for starting the drive, a location for one or more pause during the drive a location of destination of the drive, or a route taken during the drive, or combination thereof.

The driving pattern data (4) can also include a driving behaviour of the user during the drive which is related to a driving deficiency and is defined by over-speeding, hard acceleration, sudden braking, fast cornering, quick lane changing, distracted driving, or dangerous driving over bumps, or combination thereof.

The motion statistical data (3) and the driving pattern data (4) are further communicated to the first processing unit (6) for further processing. In one embodiment, where the processing of these data is not required in real time, they can be stored in a storage unit, and can be retrieved at the time of processing.

The first processing unit (6) receives and processes the motion statistical data (3), the driving pattern data (4), and a sound data (5) based on the trained machine learning models (7, 8, 9) to determine the drive related information (10, 11) for the commutation being carried out by the user in the vehicle.

The trained machine learning models are:

a first model (7) which is developed based on patterns and thresholds of motion statistical data for different vehicles. Each travel mode such as car, bus, train and subway have distinct speed and acceleration patterns which are encoded as part of the motion statistical data characteristics. This model can be periodically trained in the cloud server using the motion statistical data developed based on sensor data collected from Smartphone of all Users of the System as they travel.

a second model (8) which is developed based on the motion statistical characteristics and driving patterns of each Driver. Each Driver has a style, driving behavior and driving pattern which is encoded in the motion statistical data characteristics and the driving pattern characteristics. Machine Learning Model for each Driver can be periodically trained in the cloud server using sensor data collected from Smartphone of each User. As an embodiment of the Invention, this Machine Learning model for each Driver may be trained to identify a pro and anti-pattern of that Driver.

a third model (9) which is developed based on patterns of sound data captured from microphone kept inside vehicle, and associates sound data with an engine's noise of starting and running user's own vehicle with respect to another vehicle. This sound-based machine learning model for each vehicle can be periodically trained in the cloud server using sound data collected from smartphone of each user driving that vehicle. As an embodiment of the Invention, this machine Learning model for each vehicle may be trained to identify a pro and anti-pattern of that Vehicle.

The first processing unit (6) is processing the motion statistical data (3), and a sound data (5) based on the first model (7), and the third model (9) to determine a vehicle type (10) used during the drive for the commutation being carried out by the user in the vehicle, such as such as car, taxi, bus, train, two-wheeler, subway, other.

The sound data (5) is captured using microphone (2) of the mobile phone or the smartphone being carried by the user inside the vehicle. The microphone (2) can also be part of any other devices placed inside the vehicle. The sound data may include statistical characteristics and frequency profile of the sound captured by the microphone (2).

The first processing unit (6) processes the motion statistical data (3) and the driving pattern data (4) based on the second model (8) and determine a user role (11) as a driver or a commuter used during the drive for the commutation being carried out by the user in the vehicle.

The first processing unit receives and processes a mobile phone usage data (12) related to use of mobile phone or connections established by the mobile phone or combination thereof. The first processing unit (6) is adapted to process the mobile phone usage data (12) based on a set of predefined rules (13), and the driving sensor statistical data (3), the driving pattern data (4), and, the sound data (5) using the trained models (7, 8, 9) and determines the drive related information (10, 11) for the commutation being carried out by the user in the vehicle. In an alternate embodiment, the mobile phone usage data (12) is not considered, and only the driving sensor statistical data (3), the driving pattern data (4), and, the sound data (5) are used to determine the drive related information (10, 11) for the commutation being carried out by the user in the vehicle The mobile phone usage data (12) includes an application usage data, or a Bluetooth connection data or combination thereof. The application usage data relates to frequency and duration of various mobile applications opened and used by the user during the drive. The Bluetooth connection data relates to duration and frequency of various connections of the mobile phone being carried by the user to one or more peripheral Bluetooth devices, such as the entertainment Head Unit or Car Stereo, sensor, tag or device that is connected to the vehicle, etc. Instead of Bluetooth, any other wireless connection data to the peripheral devices of the vehicle can also be considered as part of mobile phone usage data.

The set of predefined rules (13) may include:

a) If the User uses multiple Apps frequently and for long durations during the drive, it's considered that the User is a passenger.

b) If the User is using a ride-hailing App just before and/or the drive, it is considered that the Travel mode is Taxi and User is a Passenger.

c) If the smartphone auto-connects to the paired entertainment Head Unit, Infotainment Unit or Vehicle's Stereo System, then the User is determined to be in his/her own vehicle.

d) If the smartphone auto-connects to the Bluetooth enabled sensor, tag or device of the vehicle, then the User is determined to be in his/her own vehicle.

e) If the smartphone auto-connects to multiple peripheral Bluetooth units during the drive, the top peripheral units in terms of frequency and duration of connection are chosen to determine if the User is in his/her own vehicle.

Rule based processing predicts the likelihood (probability) of each of the travel mode (such as car, taxi, bus, train, two-wheeler, subway, other) and the likelihood (probability) that the user is a driver or a passenger.

The system (1) includes an input module (22) which receives a validation input (23) related to a role of the user as a driver or the commuter, or a type of the vehicle, or combination thereof. The first processing unit (6) is placed inside the mobile phone of the user in the vehicle. The first processing unit (6) is communicatively coupled to a server processing unit (24) and sends the drive related data (10, 11), the validation input (23), the motion statistical data (3), a driving pattern data (4), and, a sound data (5) to the server processing unit (24). The server processing unit (24) is updates one or more of the trained machine learning models (7, 8, 9) and send the updated trained machine learning models (7, 8, 9) to the processing module placed inside the mobile phone to replace the previously used the one or more of trained machine learning models (7, 8, 9). It is to be noted that in one implementation, the updating of the models (7, 8, 9) is not desired, and in such scenario, no communication coupling between the first processing unit (6) and the server processing unit (24) is required. In another embodiment, one or more of the drive related data (10, 11), the validation input (23), the motion statistical data (3), a driving pattern data (4), and, a sound data (5) is sent to the server processing unit (24), and, accordingly, based on the data received and processed, only one or more of the models (7, 8, 9) can be updated.

The main advantages of keeping the training of machine learning model in client-server architecture are:

Smartphone based prediction module is light weight and generates predictions based on the latest trained models on the Smartphone itself.

Instead of transferring voluminous sensor data and sound data from each drive to the Cloud, only the predictions and derived characteristics from each trip data are pushed to the server.

Cloud based Machine Learning model Training Unit uses the validated predictions and predictions across all smartphone users to continuously train the Machine Learning models. Since model training is computationally expensive, this is best carried on the server. Cloud based Machine learning model training also enables the System to experiment with newer and different Machine Learning models from time to time using the entire historical training data-set and select the best model.

In this way, our architecture continuously trains the Machine Learning model and makes predictions with optimal use of smartphone and server-based resources.

LIST OF REFERENCE SIGNS

1 System
2 Microphone placed inside the vehicle
3 Motion statistical data
4 Driving pattern data
5 Sound data
6 First processing unit
7 First trained machine learning model
8 Second trained machine learning model
9 Third trained machine learning model
10 Vehicle type information
11 User role information
12 Mobile Phone usage data
13 Set of predefined rules
14 3-axis accelerometer
15 Accelerometer data
16 Direction sensor
17 Speed data
18 Second processing unit
19 Direction data
20 Orientation sensor
21 Orientation data
22 Input module
23 Validation input
24 Server processing unit
25 Memory unit

I claim:

1. A system (1) for determining a drive related information (10, 11) for a commutation being carried out by a user in a vehicle, the system (1) comprising:

an input interface adapted to receive a motion statistical data (3), a driving pattern data (4), or, a sound data (5), or combination thereof, wherein:

the motion statistical data (3) is statistical data derived from acceleration, or speed, or combination thereof of a vehicle at various instances during a trip, the driving pattern data (4) is related to driving patterns of a driver, or a driving behaviour of a driver or combination thereof derived using various sensory data captured from sensors placed inside the vehicle, and the sound data (5) is related to statistical pattern, or frequency profile derived using a microphone kept inside the vehicle, and a first processing unit (6) is adapted to receive and process the motion statistical data (3), or the sound data (5) based at least on the first model (7), or the third model (9), or combination thereof, to determine a vehicle type (10) used during the drive for the commutation being carried out by the user in the vehicle, or the first processing unit (6) is adapted process the motion statistical data (3) and the driving pattern data (4) based on the second model (8) to determine a user role (11) as a driver or a commuter used during the drive for the commutation being carried out by the user in the vehicle, or a combination thereof, wherein the first model (7) is developed based on patterns and thresholds of motion statistical data for different vehicles, wherein the second model (8) is developed based on the statistical characteristics and driving patterns of each driver, and wherein the third model (9) is developed based on patterns of sound data captured from microphone kept inside vehicle, and associates sound data with an engine's noise of starting and running user's own vehicle with respect to another vehicle, or combination thereof.

2. The system (1) as claimed in claim 1, wherein the input interface (2) adapted to receive a mobile phone usage data (12) related to use of mobile phone or connections established by the mobile phone or combination thereof, and wherein the first processing unit (6) is adapted to process the mobile phone usage data (12) based on a set of predefined rules (13), and the driving sensor statistical data (3), a driving pattern data (4), or, a sound data (5), or combination thereof based at least one or more of the trained models (7, 8, 9) to determine the drive related information (10, 11) for the commutation being carried out by the user in the vehicle.

3. The system (1) as claimed in claim 2, wherein the mobile phone usage data (12) comprises an application usage data, or a Bluetooth connection data or combination thereof, the application usage data relates to frequency and duration of various mobile applications opened and used by the user during the drive, and the Bluetooth connection data relates to duration and frequency of various connections of the mobile phone being carried by the user to one or more peripheral Bluetooth devices.

4. The system (1) as claimed in claim 1 comprising:

a 3-axis accelerometer (14) placed inside the vehicle, the 3-axis accelerometer is adapted to generate an accelerometer data (15) related to an acceleration of the vehicle at each time instant, or a direction sensor (16) placed inside the vehicle, and adapted to generate a speed (17) of the vehicle at each time instant, or combination thereof, a second processing unit (18) adapted to process the accelerometer data (15), or the speed data (17), or combination thereof to generate the motion statistical data (3).

5. The system (1) as claimed in claim 4, wherein the direction sensor (16) is adapted to generate a direction data (19) related to a direction in which the 3-axis accelerometer (14) is travelling, the system (1) comprising:

an orientation sensor (20) placed inside the vehicle, and adapted to generate an orientation data (21) related to an orientation and an angular velocity of the 3-axis accelerometer (14), wherein the second processing unit (18) is adapted to process the accelerometer data (15), the direction data (19) and the orientation data (20) to generate the driving pattern data (4).

6. The system (1) as claimed in claim 1, wherein the driving pattern data (4) comprises a distance covered in the drive, a duration covered in the drive, a time of the drive, a day of drive, a location for starting the drive, a location for one or more pause during the drive a location of destination of the drive, or a route taken during the drive, or combination thereof.

7. The system (1) as claimed in claim 1, wherein the driving pattern data (4) comprises a driving behaviour of the user during the drive which is related to a driving deficiency and is defined by over-speeding, hard acceleration, sudden braking, fast cornering, quick lane changing, distracted driving, or dangerous driving over bumps, or combination thereof.

8. The system (1) as claimed in claim 1 comprising:

an input module (22) adapted to receive a validation input (23) related to a role of the user as a driver or the commuter, or a type of the vehicle, or combination thereof, wherein the first processing unit (6) comprises one or more processing modules, and at least one of the processing modules is placed inside the mobile phone of the user in the vehicle and the processing module placed inside the mobile phone of the user in the vehicle is adapted to be communicatively coupled to a server processing unit (24) and adapted to send the drive related data (10, 11), the validation input (23), the motion statistical data (3), a driving pattern data (4), or, a sound data (5), or combination thereof to the server processing unit (24), and the server processing unit (24) is adapted to update the one or more of trained machine learning models (7, 8, 9) and to send the updated one or more of trained machine learning models (7, 8, 9) to the processing module placed inside the mobile phone to replace the previously used the one or more of trained machine learning models (7, 8, 9).

\* \* \* \* \*